United States Patent [19]
Spear et al.

[11] Patent Number: 6,023,712
[45] Date of Patent: Feb. 8, 2000

[54] METHOD AND APPARATUS FOR BROKERING MEMORY RESOURCES

[75] Inventors: Daniel S. Spear, Beverly Hills, Calif.; Philip B. Gardner, Woodbury, Minn.

[73] Assignee: Quarterdeck Corporation, Santa Monica, Calif.

[21] Appl. No.: 08/904,969

[22] Filed: Jul. 30, 1997

[51] Int. Cl.[7] .................................................. G06F 12/02
[52] U.S. Cl. .......................................... 707/205; 711/170
[58] Field of Search ..................................... 711/170, 171, 711/172, 173; 707/205, 206; 395/674

[56] References Cited

U.S. PATENT DOCUMENTS

| | | | |
|---|---|---|---|
| 5,109,336 | 4/1992 | Guenther et al. | 711/171 |
| 5,579,508 | 11/1996 | Yoshizawa et al. | 711/172 |
| 5,588,138 | 12/1996 | Bai et al. | 711/173 |
| 5,675,793 | 10/1997 | Crick et al. | 395/651 |
| 5,689,707 | 11/1997 | Donnelly | 707/206 |
| 5,732,402 | 3/1998 | Lehman | 707/205 |
| 5,784,699 | 7/1998 | McMahon et al. | 711/171 |
| 5,809,554 | 9/1998 | Benayon et al. | 711/171 |

*Primary Examiner*—Eddie P. Chan
*Assistant Examiner*—Gary J. Portka
*Attorney, Agent, or Firm*—Hecker & Harriman

[57] ABSTRACT

The present invention provides a method and apparatus for brokering memory resources. A memory broker cooperates with one or more memory servers and one or more memory clients. The memory servers obtain usable memory space and report the availability of such memory space to the memory broker. The memory clients request and receive memory allocations from the memory broker. In one embodiment of the invention, the memory broker interacts with memory servers that may be unable to guarantee the duration of availability of the memory space they provide. The memory broker can fulfill memory requests from memory clients using portions of memory distributed among multiple memory servers.

18 Claims, 14 Drawing Sheets

METHOD AND APPARATUS FOR BROKERING MEMORY RESOURCES

BACKGROUND OF THE INVENTION

1. Field of the Invention

The present invention relates generally to memory allocation and particularly to a technique for dynamically brokering memory resources.

2. Background Art

Computer systems use memory devices to store system software, application programs, and the data being processed. Usage of the memory space provided by the memory devices is allocated to different processes operating on a computer system. However, at times the memory usage increases beyond the limits of the memory resources available on a computer system. Consequently, memory management software has been developed that reorganizes memory space to effectively increase the amount of available memory space. Different memory management programs use different techniques to optimize memory usage and recover otherwise wasted memory space. Unfortunately, these different memory management programs are often mutually incompatible.

Furthermore, application programs that obtain additional memory space from these memory management programs sometimes have to be specifically programmed to interact with particular memory management programs and may not be compatible with all of the available memory management programs. Therefore, it may be difficult or impossible to obtain the benefits of several different types of memory management software simultaneously.

In the past, memory management software typically reorganized memory space initially to obtain effectively more memory space, then left the memory space in its reorganized form. The result was a memory configuration that remained static and was unable to adapt to further changes in memory availability and usage. Consequently, not all memory that could possibly be utilized was made available to be utilized. Furthermore, memory space that was only temporarily available could not be utilized since no means was provided to communicate and control the unavailability of the memory space after its temporary availability had ended.

SUMMARY OF THE INVENTION

The present invention provides a method and apparatus for brokering memory resources. The present invention avoids the mutual incompatibilities associated with prior art memory management techniques. The invention also avoids the problems associated with the static memory space reorganization of the prior art techniques.

In the present invention, a memory broker cooperates with one or more memory servers and one or more memory clients. The memory servers obtain usable memory space and report the availability of such memory space to the memory broker. The memory clients request and receive memory allocations from the memory broker.

In one embodiment of the invention, the memory broker interacts with memory servers that may be unable to guarantee the duration of availability of the memory space they provide. If a memory server reserves the right to demand immediate return of the memory space it is providing, such memory space is characterized as "discard-only memory." If a memory server is providing memory space that will not need to be immediately reclaimed, such memory space is characterized as "non-discard-only memory."

When a memory server registers with the memory broker, the memory server specifies the type and amount of memory that it can provide. When a memory client requests memory from the memory broker, the memory client specifies the type and amount of memory that it desires. The memory broker polls the memory servers to ensure that it has current information as to the availability of memory from the memory servers. The memory broker then attempts to allocate memory of the desired type and amount from the memory servers to the memory client that is requesting memory.

The memory broker can fulfill memory requests from memory clients using portions of memory distributed among multiple memory servers. Since memory space is fungible, a memory client does not need to be provided with information as to which memory servers are providing it with memory space or how much memory space each memory server is providing. A memory client need only be able to communicate with the memory broker, not directly with the memory servers or other memory clients.

Likewise, a memory server does not need to be provided with information as to which memory clients are using the memory space it is providing. A memory servers need only be able to communicate with the memory broker, not directly with the memory clients or other memory servers.

DETAILED DESCRIPTION OF THE INVENTION

Figure 1:
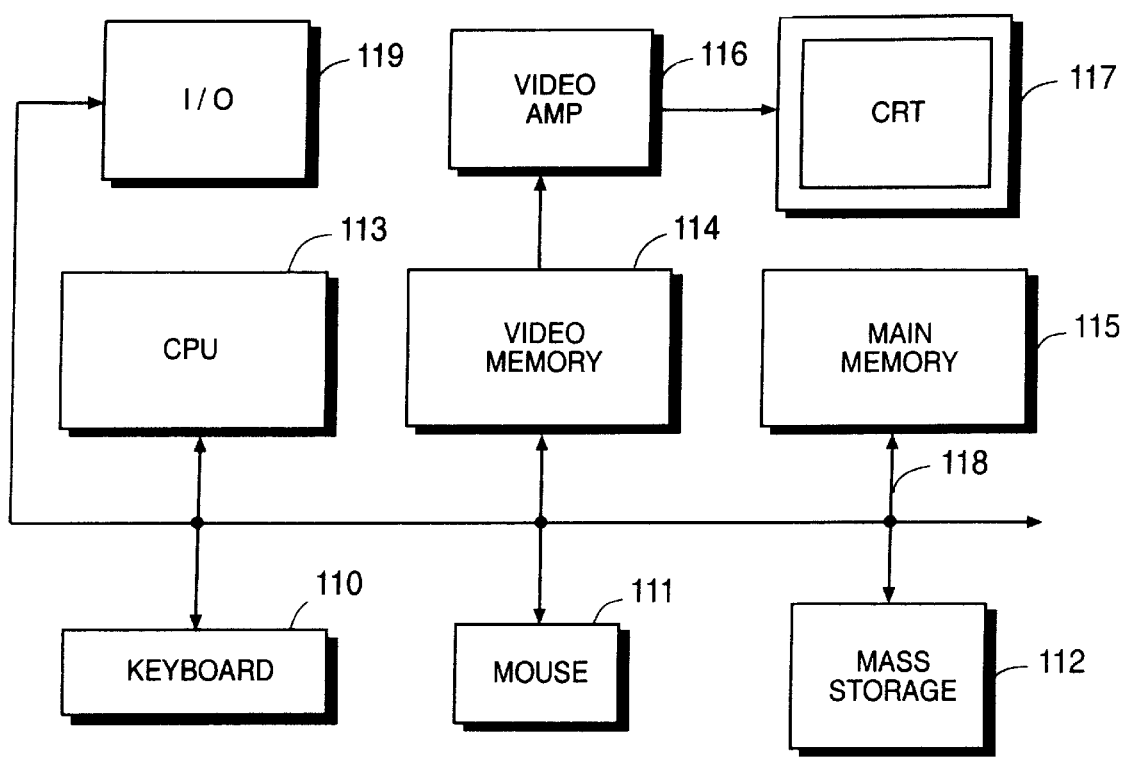
FIG. 1 provides an example of a general purpose computer that can be used in an embodiment of the invention.

A method and apparatus for brokering memory resources is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

One embodiment of the invention relates to a dynamic memory allocator or broker embodied in a driver API (application programming interface) which provides a protocol for interaction between memory clients and memory servers.

Memory clients are applications that make requests for blocks of memory from the available RAM. Memory servers are drivers which gather available memory from various memory sources, such as video memory and Windows VCache, for use by memory clients.

As a memory broker, the API determines which memory client receives which block of memory from which memory server, and keeps track of these assignments for reassignment purposes as described below. More active negotiation between memory clients and memory servers is supported than in known memory managers or allocators.

With known memory managers such as QEMM or Windows 95, drivers can exist for the purpose of transferring control of a portion of standard memory to the memory manager, typically by transmitting an address for a memory block to the memory manager. The portion of memory is simply placed into the memory pool of the memory manager for reallocation to a client. Once the driver has transferred control to the memory manager, no further interaction is required between the memory manager and the driver, and the driver can go away.

In the invention, the memory servers may be associated with special memory that cannot be simply transferred into a memory pool and forgotten. For example, a first memory server may identify unused memory from the video memory and offer it to the API. The API then assigns the offered memory to one or more memory clients. If the resolution of the video system is subsequently altered, the unused video memory may be needed by the video system to accommodate the new resolution. The API continues to interact with the memory server and the relevant memory clients to reclaim the video memory for video use.

Similar "give and take" performance occurs with respect to a second memory server and the Windows VCache subsystem. Available memory in the VCache subsystem is identified by the second memory server and offered to the API for allocation. The API then assigns the memory to requesting clients. When the memory is again needed in the VCache subsystem, the API arranges for return of the memory from the respective clients. Thus, dynamic memory handling is provided.

A further advantage of the API is that it provides a standard protocol. Memory servers and memory clients interact solely with the API, so clients and servers may be designed with only the API in mind. The addition and substitution of various memory clients and memory servers is therefore more straightforward.

Figure 8:
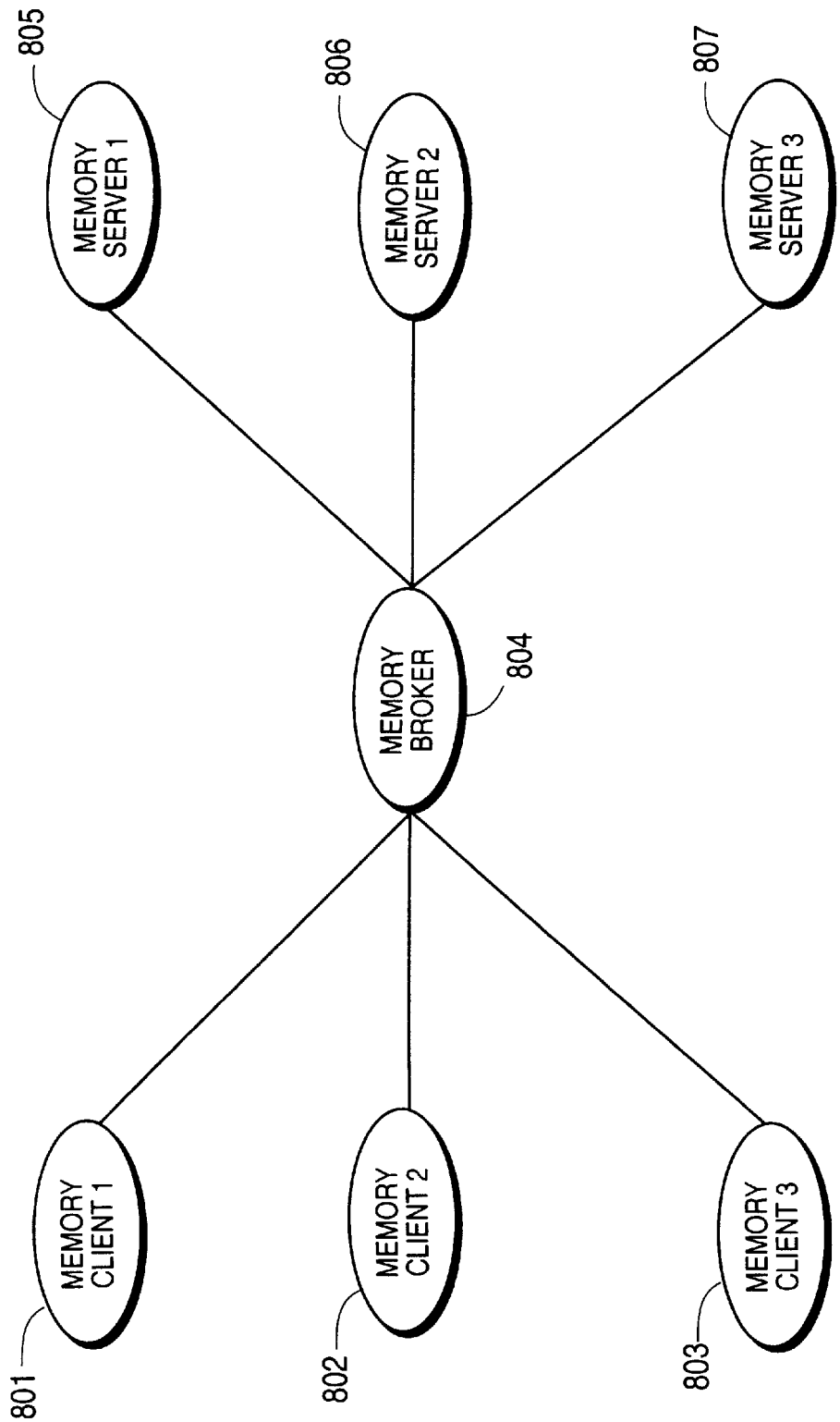
FIG. 8 is a block diagram illustrating a system according to one embodiment of the invention.

FIG. 8 is a block diagram illustrating a system according to one embodiment of the invention. The system comprises first memory client 801, second memory client 802, third memory client 803, memory broker 804, first memory server 805, second memory server 806, and third memory server 807. Memory broker 804 interfaces with each of first memory client 801, second memory client 802, and third memory client 803. Memory broker 804 also interfaces with each of first memory server 805, second memory server 806, and third memory server 807.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113.

The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In the preferred embodiment of this invention, the CPU 113 is microprocessor manufactured by Intel, such as the 80×86, Pentium, Pentium Pro, Pentium II processor, or a 32-bit microprocessor manufactured by Motorola, such as the 680×0 or Power PC processor. However, any other suitable microprocessor or microcomputer may be utilized. Main memory 115 is comprised of dynamic random access memory (DRAM).

Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel data stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment.

Figure 2:
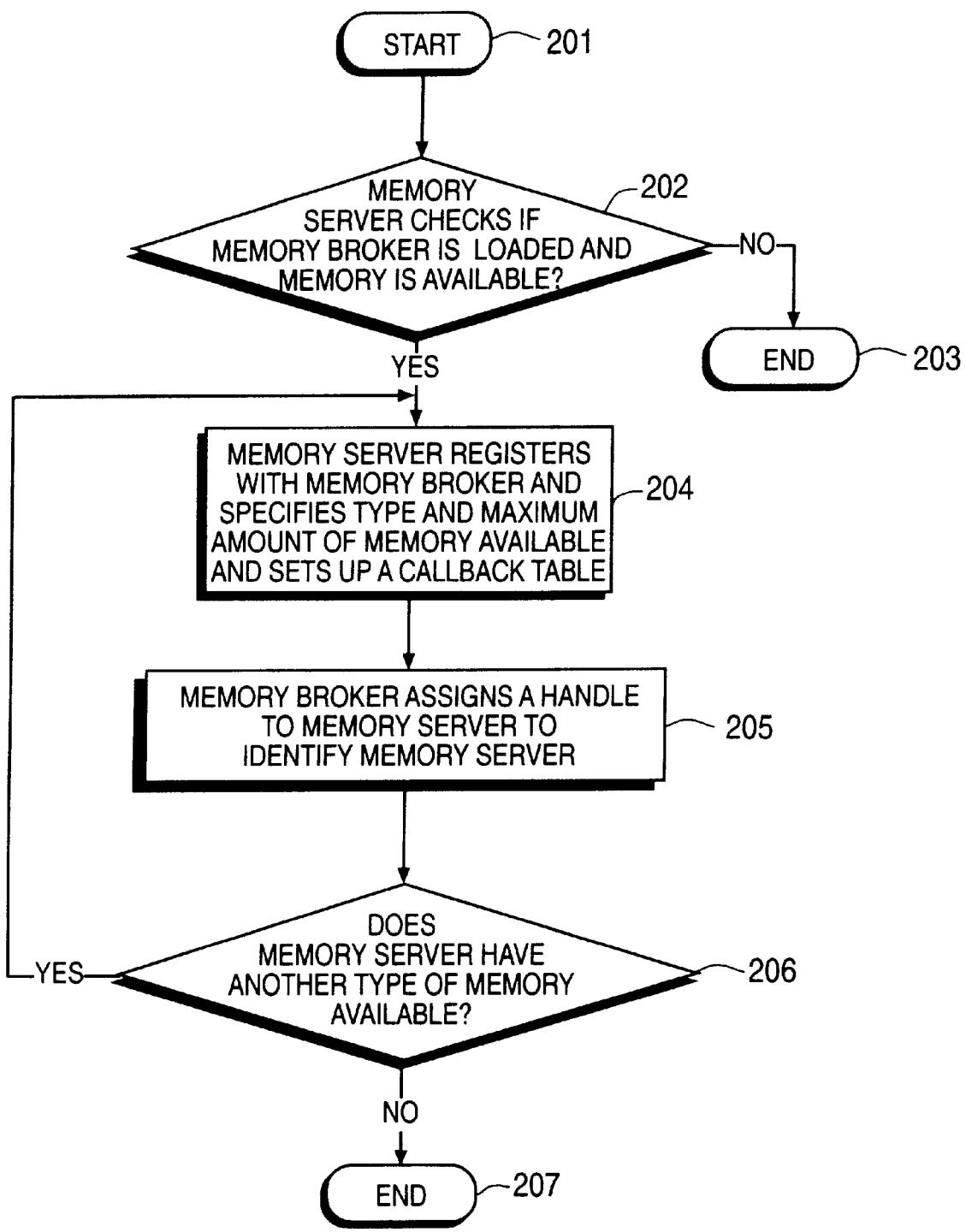
FIG. 2 is a flow diagram illustrating a process by which memory servers register with a memory broker.

FIG. 2 is a flow diagram illustrating a process by which memory servers register with a memory broker. The process begins in step 201 and continues to step 202. In step 202, the memory server checks to determine if the memory broker is loaded and if the memory server has memory available for allocation by the memory broker. If the memory broker has not been loaded or the memory server has no memory available for the memory broker, the process ends in step 203. If the memory broker is loaded and the memory server has memory available for allocation by the memory broker, the process continues in step 204.

In step 204, the memory server registers with the memory broker and specifies the type and maximum of amount of memory available for allocation by the memory broker. The memory server further sets up a call back table at step 204 for use by the memory broker to call back the memory server. Examples of types of memory that may be available from a memory server include discard only memory and non-discard memory. Discard only memory is memory that may be allocated to a memory client with the understanding that the memory client may be asked at any time to discard the memory. Discard only memory may be used by a memory client to store information that has been backed up on another medium (e.g., a hard disk drive), or to store information that can be regenerated, for example. Thus, even if the memory client were asked to immediately discard the memory, the information would not be lost, but could be retrieved from the alternate storage media or regenerated. Non-discard only memory is memory that a memory client can use with the understanding that it will be given an adequate opportunity to preserve information stored in that memory before the memory is deallocated.

From step 204, the process continues in step 205, where the memory broker assigns a handle to the memory server to identify the memory server. From step 205, the process continues in step 206. In step 206, a decision is made as to whether or not the memory server has another type of memory available. If the memory server has another type of memory available, the process returns to step 204. If the memory server does not have another type of memory available, the process ends in step 207.

Figure 10:
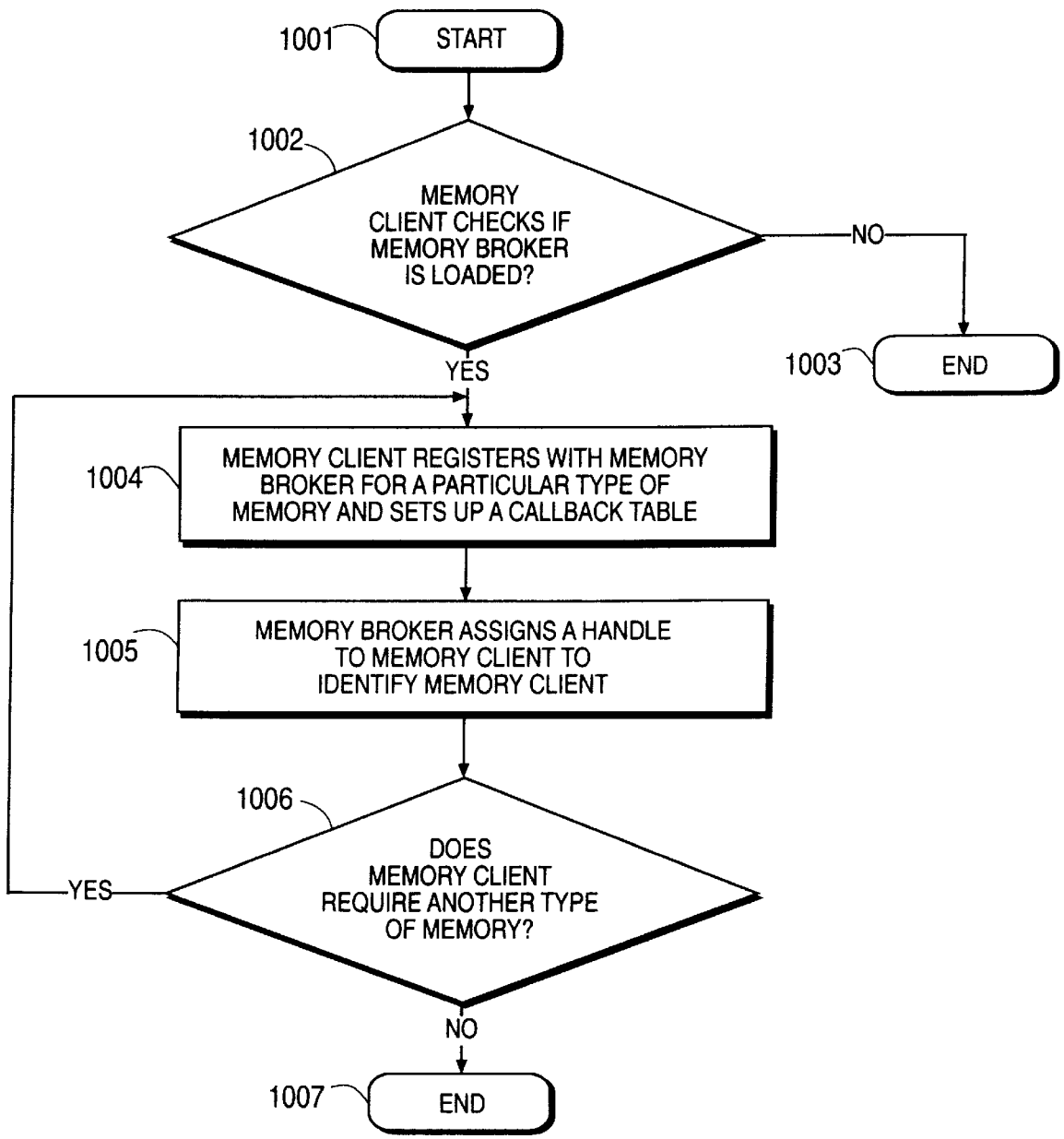
FIG. 10 is a flow diagram illustrating a process by which memory clients register with a memory broker.

FIG. 10 is a flow diagram illustrating a process by which memory clients register with a memory broker. The process begins in step 1001. The process continues in step 1002, where a memory client checks to determine if the memory broker is loaded. If the memory broker is not loaded, the process ends in step 1003. However, if the memory broker is loaded, the process continues in step 1004. In step 1004, the memory client registers with the memory broker for a particular type of memory and sets up a call back table. The call back table may be used if the memory broker wants to call back the memory client.

From step 1004, the process continues in step 1005. In step 1005, the memory broker assigns a handle to the memory client to identify the memory client. The handle may be used by the memory client to identify itself in further transactions with the memory broker. From step 1005, the process continues in step 1006. In step 1006, a decision is made as to whether or not the memory client requires another type of memory. If the memory client requires another type of memory, the process returns to step 1004. If the memory client does not require another type of memory, the process ends in step 1007.

Figure 3:
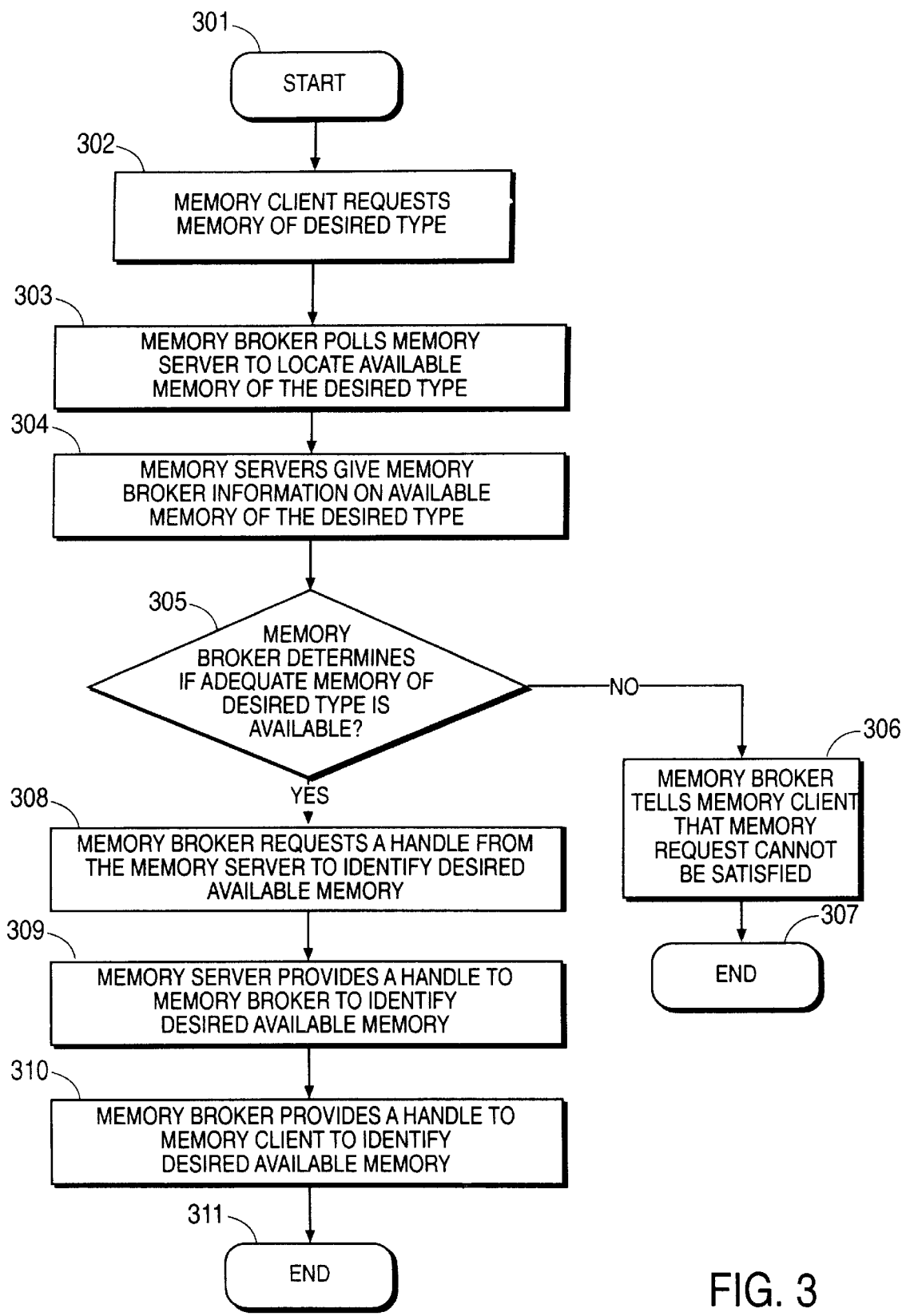
FIG. 3 is a flow diagram of a process for allocating memory according to one embodiment of the present invention.

FIG. 3 is a flow diagram of a process for allocating memory according to one embodiment of the present invention. The process begins in step 301 and continues to step 302. In step 302, a memory client requests memory from a memory broker. The request specifies the amount of memory requested and the desired type of memory requested. From step 302, the process continues to step 303. In step 303, the memory broker pulls memory servers to locate available memory of the desired type. From step 303, the process continues to step 304. In step 304, the memory servers give the memory broker information on the amount of memory they have available that is of the desired type. From step 304, the process continues to step 305. In step 305, the memory broker determines if adequate memory of the desired type is available. If the memory broker determines that insufficient memory of the desired type is available, the process continues in step 306. In step 306, the memory broker indicates to the memory client that the memory request cannot be satisfied. From step 306, the process continues to step 307. The process ends in step 307.

If, however, the memory broker determines that adequate memory of the desired type is available, the process continues from step 305 to step 308. In step 308, the memory broker requests a handle from the memory server to identify the desired available memory. From step 308, the process continues in step 309. In step 309 the memory server provides a handle to the memory broker to identify the desired available memory. This handle may be used by the memory broker to identify this particular portion of memory in further interaction with the memory server. From step 309, the process continues in step 310. In step 310, the memory broker provides a handle to the memory client to identify the desired available memory. This handle may be used by the memory client to identify this particular memory and further interaction with the memory broker. From step 310, the process continues in step 311. The process ends in 311.

Figure 4:
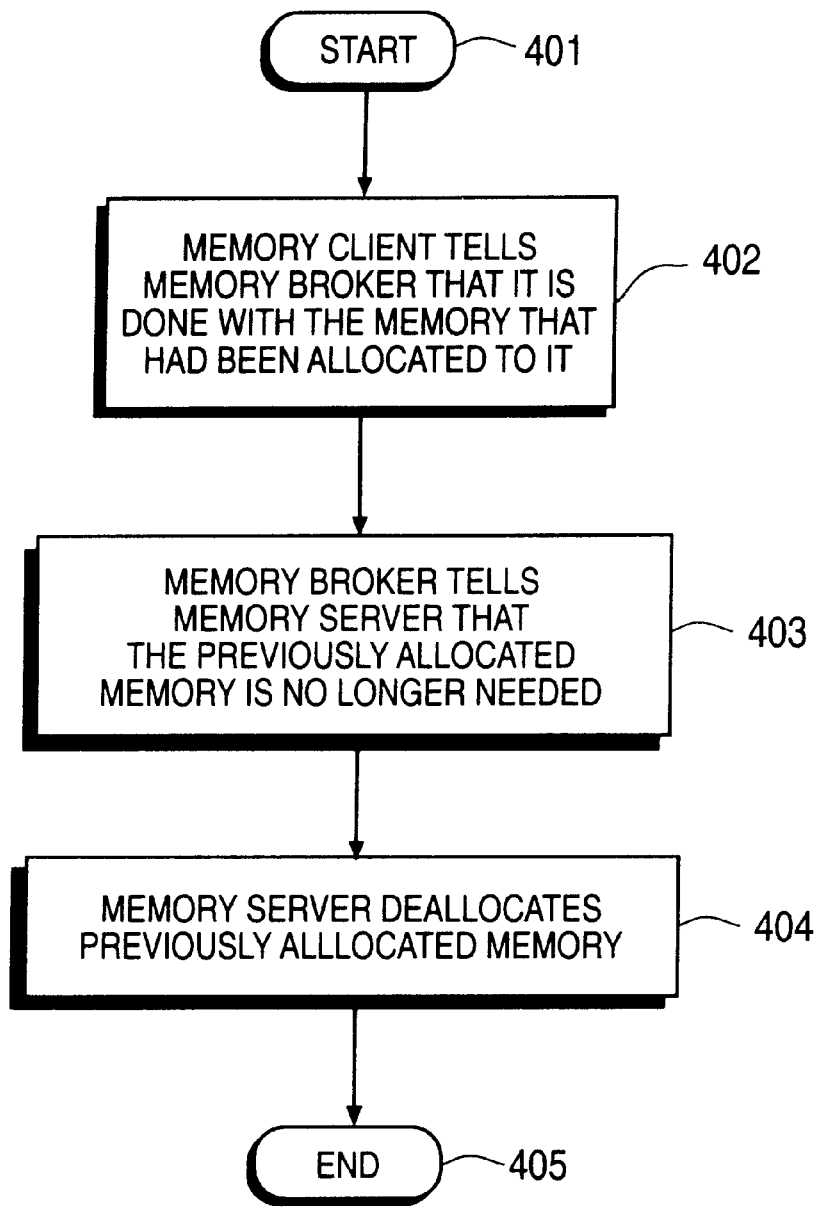
FIG. 4 is a flow diagram illustrating a process for deallocation of memory that is no longer needed by the memory client according to one embodiment of the present invention.

FIG. 4 is a flow diagram illustrating a process for deallocation of memory that is no longer needed by the memory client according to one embodiment of the present invention. The process begins in step 401 and continues to step 402. In step 402, the memory client indicates to the memory broker that the memory client is done with the memory that had been allocated to it. The process continues from step 402 to step 403. In step 403, the memory broker indicates to the memory server that the previously allocated memory is no longer needed. From step 403, the process continues to step 404. In step 404, the memory server deallocates the previously allocated memory. From step 404, the process continues to step 405. The process ends in step 405.

Figure 5:
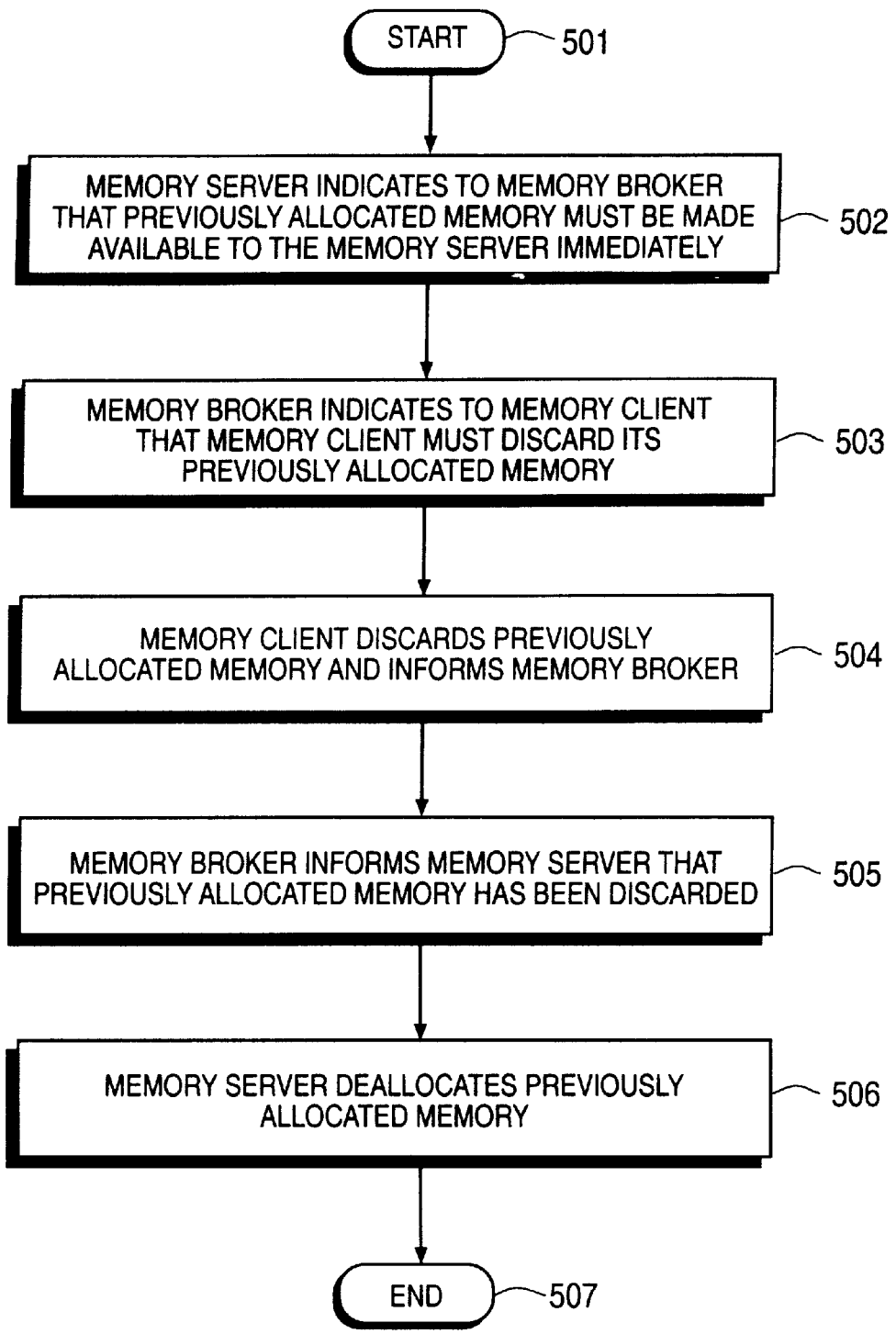
FIG. 5 is a flow diagram illustrating a process by which a memory server requires previously allocated memory to be discarded.

FIG. 5 is a flow diagram illustrating a process by which a memory server requires previously allocated memory to be discarded. The process begins in step 501 and continues to step 502. In step 502, the memory server indicates to the memory broker that the previously allocated memory must be made available to the memory server immediately. From step 502, the process continues to step 503. In step 503, the memory broker indicates to the memory client that the memory client must discard its previously allocated memory immediately. From step 503 the process continues to step 504. In step 504, the memory client discards previously allocated memory and informs the memory broker. From step 504, the process continues to step 505. In step 505, the memory broker informs the memory server that previously allocated memory has been discarded. From step 505, the process continues to step 506. In step 506, the memory server deallocates previously allocated memory. From step 506, the process continues to step 507. In step 507 the process ends.

Figure 6:
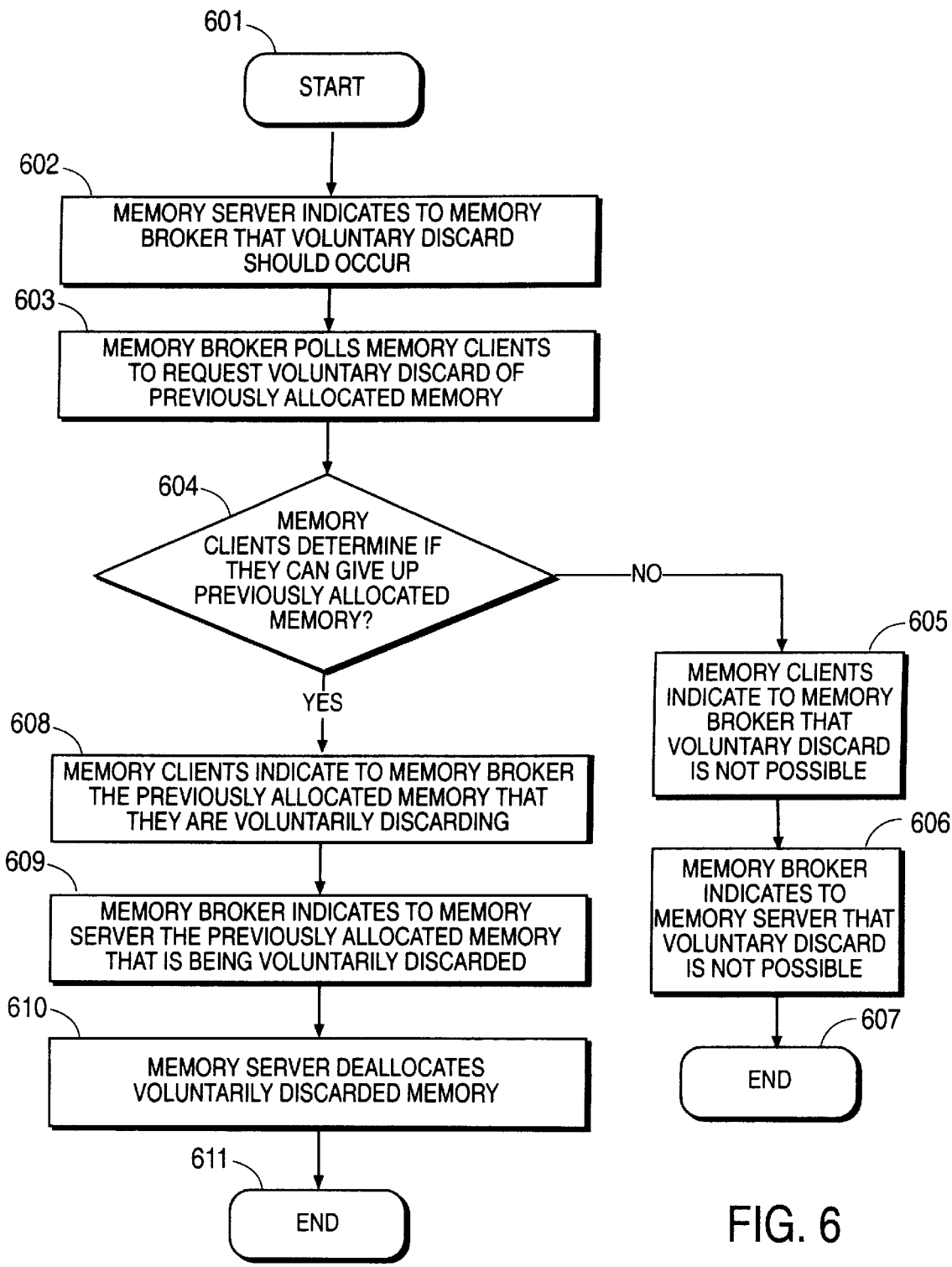
FIG. 6 is a flow diagram illustrating a voluntary memory discard process according to one embodiment of the present invention.

FIG. 6 is a flow diagram illustrating a voluntary memory discard process according to one embodiment of the present invention. The process begins in step 601 and continues to step 602. In step 602, a memory server indicates to a memory broker that a voluntary discard of memory should occur. From step 602, the process continues in step 603. In step 603, the memory broker polls the memory clients to request voluntary discard of previously allocated memory. From step 603, the process continues to step 604. In step 604, the memory clients determine if they can reasonably give up previously allocated memory. If the memory clients cannot give up previously allocated memory, the process continues to step 605. In step 605, the memory clients indicate to the memory broker that a voluntary discard of memory is not possible. From step 605, the process continues in step 606. In step 606 the memory broker indicates to the memory server that a voluntary discard of memory is not possible. From step 606, the process continues to step 607. The process ends in step 607.

If, however, the memory clients determine that they cannot give out previously allocated memory, the process continues from step 604 to step 608. In step 608, the memory clients indicate to the memory broker the previously allocated memory that they are voluntarily discarding. From step 608, the process continues to step 609. In step 609 the memory broker indicates to the memory server the previously allocated memory that is being voluntarily discarded. From step 609, the process continues to step 610. In step 610, the memory server deallocates voluntarily discarded memory. From step 610, the process continues to step 611. The process ends in step 611.

Figure 7:
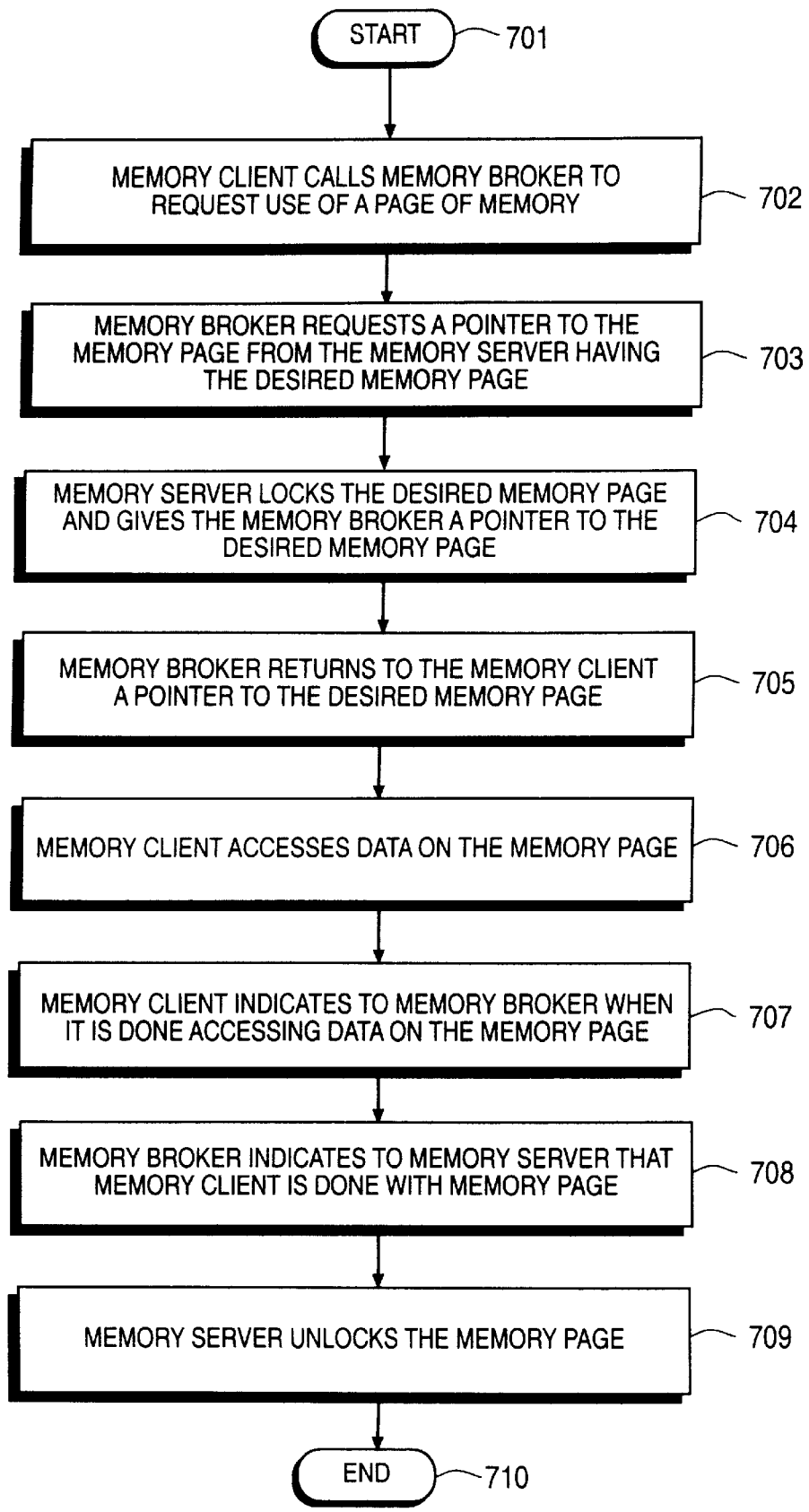
FIG. 7 is a flow diagram illustrating a process by which a memory client accesses memory that has been allocated to it by the memory broker.

FIG. 7 is a flow diagram illustrating a process by which a memory client accesses memory that has been allocated to it by the memory broker. The process being in step 701 and continues to step 702. In step 702, the memory client calls the memory broker to request use of a page of memory. This page of memory is located within the memory that has been allocated to the memory client from the memory broker. From step 702, the process continues to step 703. In step 703, the memory broker requests a pointer to the memory page from the memory server having the desired memory page.

From step 703, the process continues to step 704. In step 704, the appropriate memory server locks the desired memory page and gives the memory broker a pointer to the desired memory page. From step 704, the process continues to step 705. In step 705, the memory broker returns a pointer to the desired memory page to the memory client. From step 705, the process continues to step 706. In step 706, the memory client accesses data on the memory page indicated by the pointer. From step 706, the process continues to step 707. In step 707, the memory client indicates to the memory broker when it is done accessing data on the memory page. From step 707, the process continues to step 708. In step 708, the memory broker indicates to the memory server that the memory client is done accessing the indicated memory page. From step 708, the process continues to step 709. In step 709, the memory server unlocks the indicated memory page. From step 709, the process continues in step 710. The process ends in step 710. The steps of locking and unlocking may be omitted for non-discard-only memory since on-discard-only memory may be initially locked and maintained in a locked state without adversely affecting performance.

Figure 9:
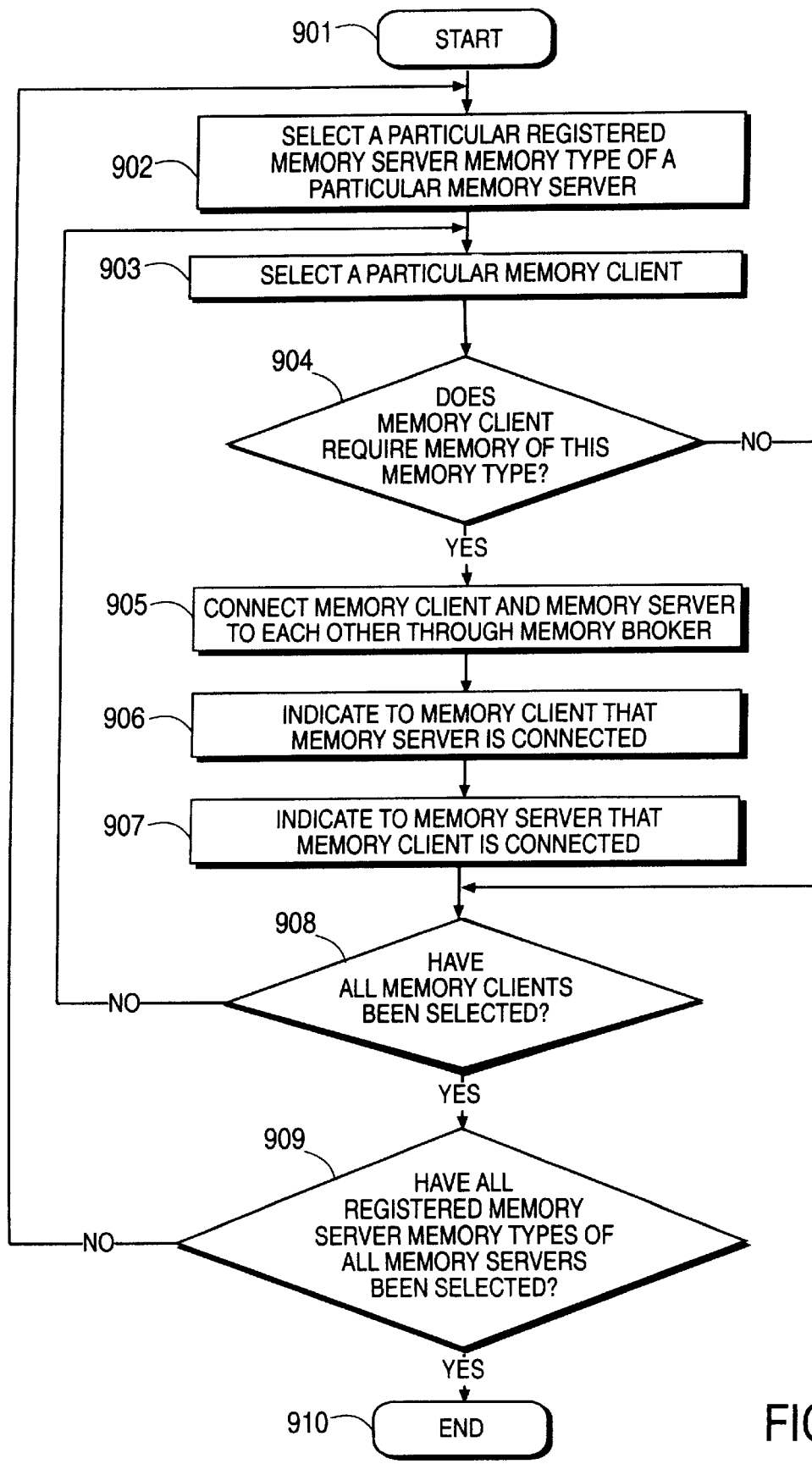
FIG. 9 is a flow diagram illustrating one embodiment of a process by which a memory broker connects memory clients with compatible memory servers.

FIG. 9 is a flow diagram illustrating one embodiment of a process by which a memory broker connects memory clients with compatible memory servers. This process occurs in the memory broker after clients and servers have registered with the memory broker. The process begins in step 901 and continues to step 902. In step 902, the memory broker selects a particular memory type of a particular memory server that has been registered with the memory broker. From step 902, the process continues in step 903. In step 903, the memory broker selects a particular memory client among the memory clients that have registered with the memory broker. From step 903, the process continues in step 904. In step 904, a decision is made as to whether or not the selected memory client requires memory of the selected memory type. If the memory client requires memory of the selected memory type, the process continues in step 905.

In step 905, the memory broker connects the memory client and the memory server to each other. The memory broker continues to serve as an intermediary between the memory client and the memory server. The memory broker provides to the memory client a handle representative of the memory server to allow the memory client to specify the memory server when the memory client wishes to communicate with the memory server through the memory broker. Likewise, the memory broker provides to the memory server a handle representative of the memory client to allow the memory server to specify the memory client when the memory server wishes to communicate with the memory client through the memory broker.

From step 905, the process continues in step 906. In step 906, the memory broker indicates to the memory client that the memory server is connected. From step 906, the process continues in step 907. In step 907, the memory broker indicates to the memory server that the memory client is connected. Steps 906 and 907 may be performed as a single step or in the opposite order. From step 907, the process continues in step 908.

If, in step 904, the memory client does not require memory of the selected memory type, the process continues in step 908. In step 908, a decision is made as to whether or not all memory clients have been selected. If not all memory clients have been selected, the process returns to step 903, where a different memory client is selected. If all memory clients have been selected, the process continues in step 909. In step 909, a decision is made as to whether or not all registered memory server memory types of all memory servers have been selected. If not all memory types have been selected, the process returns to step 902, where a different memory type of the same memory server or a memory type of a different memory server is selected. If all memory types of all memory servers have been selected, the process ends in step 910.

Once the memory clients and memory servers are connected to each other, the memory clients wishing to communicate with the memory servers to which they are connected call an API in the memory broker and the memory servers wishing to communicate with the memory clients to which they are connected call an API in the memory broker. If the memory broker finds that the memory client or memory server with which communication is desired is actually connected to the memory client or memory server requesting the communication and supports the specified API, the memory broker passes the API call to the memory client or memory server with which communication is desired. Otherwise, a default action occurs or an error code is returned to the memory client or memory server making the API call.

Figure 11:
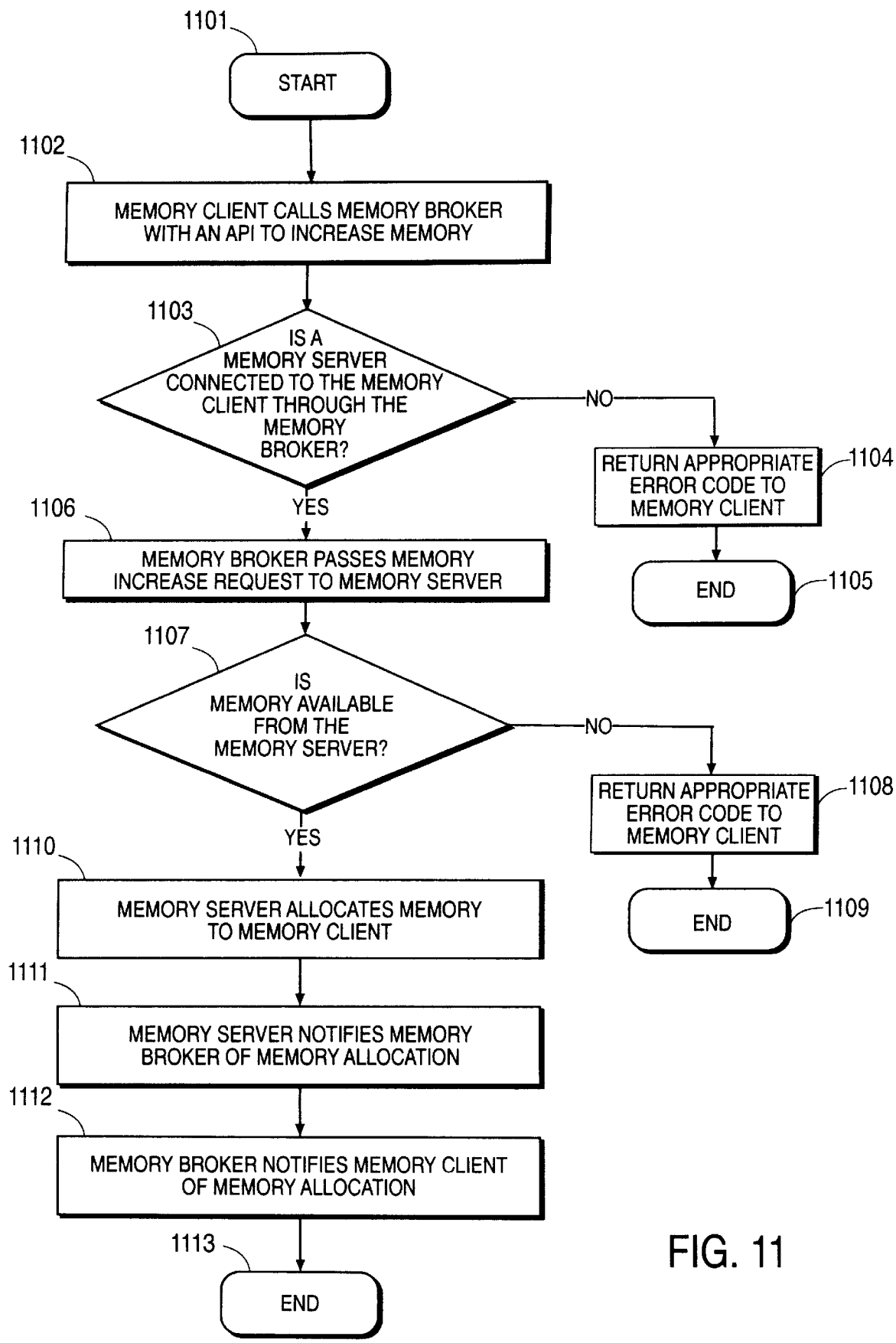
FIG. 11 is a flow diagram illustrating one embodiment of a process by which a memory client is allocated memory.

FIG. 11 is a flow diagram illustrating one embodiment of a process by which a memory client is allocated memory. The process begins in step 1101 and continues in step 1102. When a memory client needs memory, the memory client calls the memory broker in step 1102 with an API to "grow," or increase, the memory allocated to the memory client. From step 1102, the process continues in step 1103. In step 1103, a decision is made as to whether or not a memory server is connected to the memory client through the memory broker. If a memory server is not connected to through the memory broker to the memory client, the process continues to step 1104. In step 1104, the memory broker returns an appropriate error code to the memory client.

From step 1104, the process ends in step 1105. If, in step 1103, a memory server is connected through the memory broker to the memory client, the process continues to step 1106. In step 1106, the memory broker passes the "grow" request to the memory server. From step 1106, the process continues in step 1107. In step 1107, a decision is made as to whether or not memory is available from the memory server. If memory is not available, the process continues to step 1108. In step 1108, the memory broker returns an appropriate error code to the memory client. From step 1108, the process ends in step 1109. If, in step 1107, memory is available from the memory server, the process continues in step 1110. In step 1110, the memory client is allocated one or more pages of memory from the memory server.

From step 1110, the process continues in step 1111. In step 1111, the memory server notifies the memory broker of the memory allocation. From step 1111, the process continues in step 1112. In step 1112, the memory broker notifies the memory client of the memory allocation. From step 1112, the process ends in step 1113.

Figure 12:
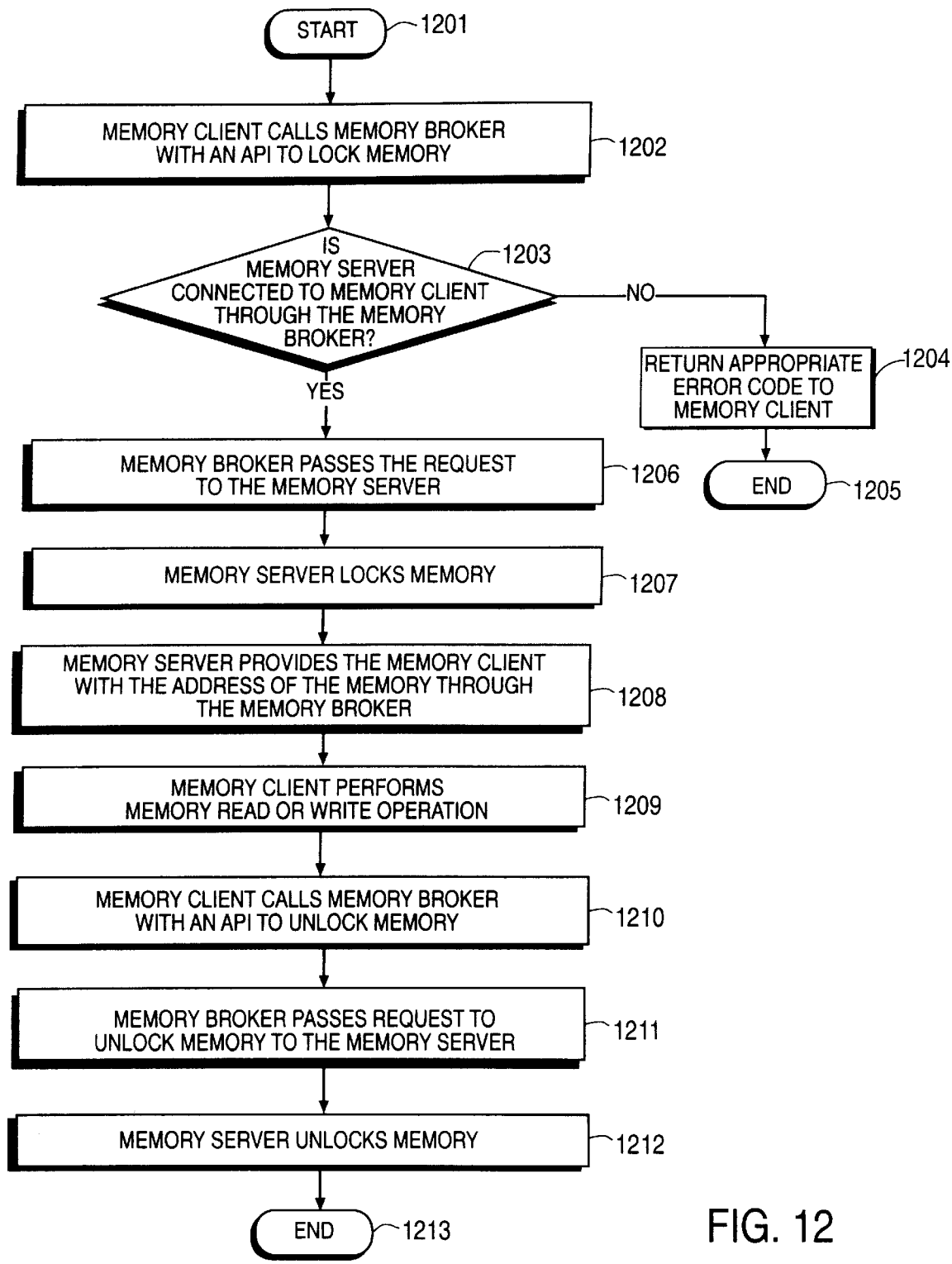
FIG. 12 is a flow diagram illustrating one embodiment of a process by which a memory client may read from or write to memory allocated to it through a memory broker.

FIG. 12 is a flow diagram illustrating one embodiment of a process by which a memory client may read from or write to memory allocated to it through a memory broker. The process begins in step 1201 and continues to step 1202. When a memory client needs to read from or write to the memory allocated to it by the memory server, the memory client calls the memory broker, in step 1202, with an API to lock the memory. From step 1202, the process continues in step 1203. In step 1203, a decision is made as to whether or not the memory server is connected to the memory client through the memory broker. If the memory server is not connected to the memory client through the memory broker, the process continues to step 1204. In step 1204, the memory broker returns an appropriate error code to the memory client. From step 1204, the process ends in step 1205.

If, in step 1203, the memory server is connected through the memory broker to the memory client, the process continues to step 1206. In step 1206, the memory broker passes the request to the memory server. From step 1206, the process continues in step 1207. In step 1207, the memory server then locks the memory. Once the memory is locked in step 1207, the memory server provides the memory client with the address of the memory in step 1208, communicating with the memory client through the memory broker.

From step 1208, the process continues to step 1209. In step 1209, the memory client uses the address to perform the read or write operation on the memory. After the memory client has completed the read or write operation in step 1209, the memory client calls the memory broker in step 1210 with an API to unlock the memory. From step 1210, the process continues to step 1211. In step 1211, the memory broker passes the request to unlock the memory to the memory server. From step 1211, the process continues to step 1212. In step 1212, the memory server unlocks the memory. From step 1212, the process ends in step 1213.

Figure 13:
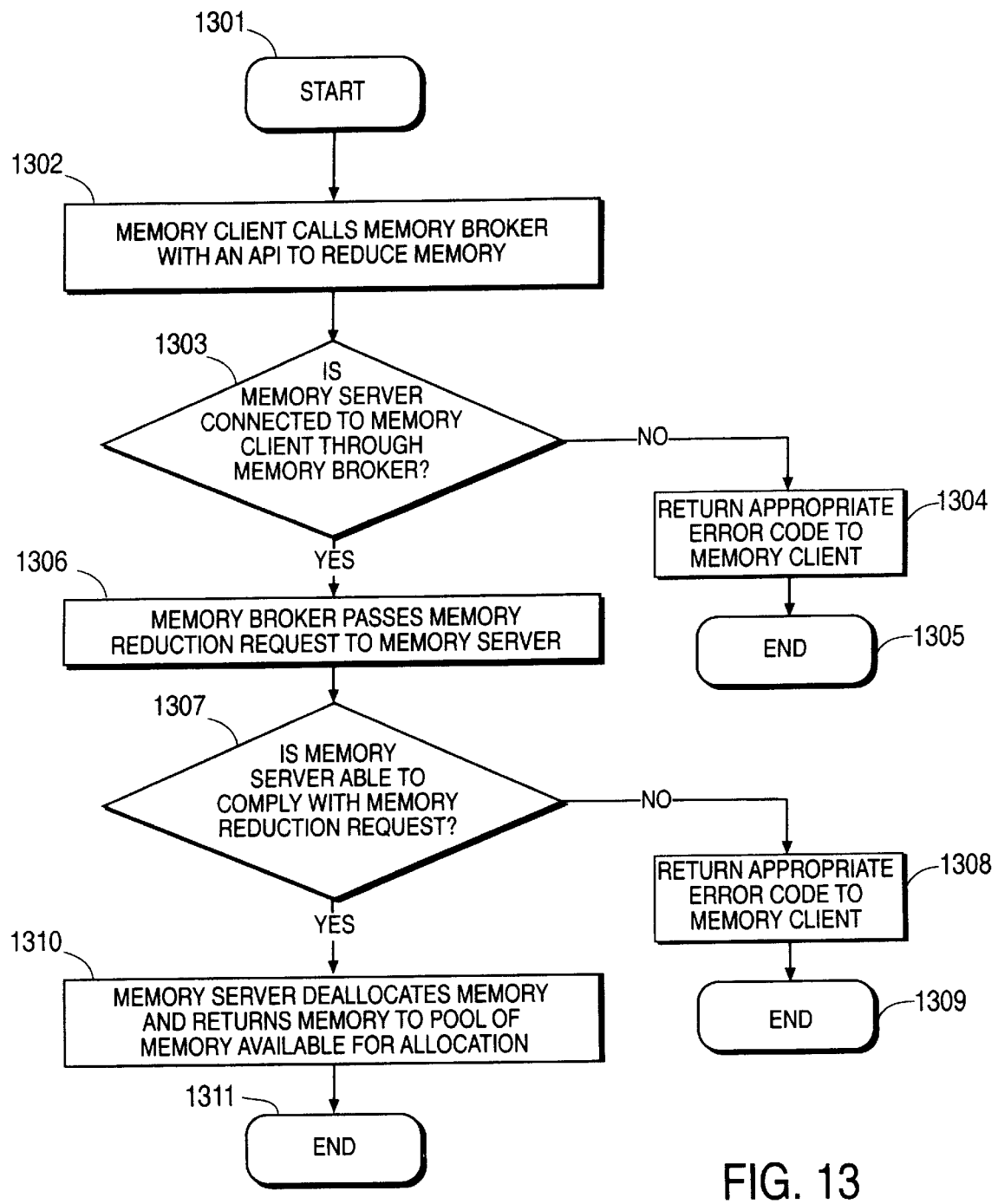
FIG. 13 is a flow diagram illustrating one embodiment of a process by which memory allocated to a memory client can be reduced.

FIG. 13 is a flow diagram illustrating one embodiment of a process by which memory allocated to a memory client can be reduced. The process begins in step 1301 and continues to step 1302. When a memory client no longer needs memory previously allocated to it, the memory client calls the memory broker in step 1302 with an API to "shrink," or reduce, the memory allocated to the memory client. From step 1302, the process continues in step 1303. In step 1303, a decision is made as to whether or not the memory server is connected to the memory client through the memory broker. If the memory server is not connected to the memory client through the memory broker, the process continues to step 1304. In step 1304, the memory broker returns an appropriate error code to the memory client. From step 1304, the process ends in step 1305.

If, in step 1303, the memory server is connected through the memory broker to the memory client, the memory broker passes the "shrink" request to the memory server in step 1306. From step 1306, the process continues to step 1307. In step 1307, a decision is made as to whether or not the memory server is able to comply with the memory reduction request. If the memory server is unable to comply with the "shrink" request, the process continues to step 1308. In step 1308, the memory broker returns an appropriate error code to the memory client. From step 1308, the process ends in step 1309.

If, in step 1307, the memory server is able to comply with the "shrink" request, the memory server deallocates the previously allocated memory page or pages and returns this page or these pages to its pool of memory pages available for allocation to memory clients in step 1310. From step 1310, the process ends in step 1311.

Figure 14:
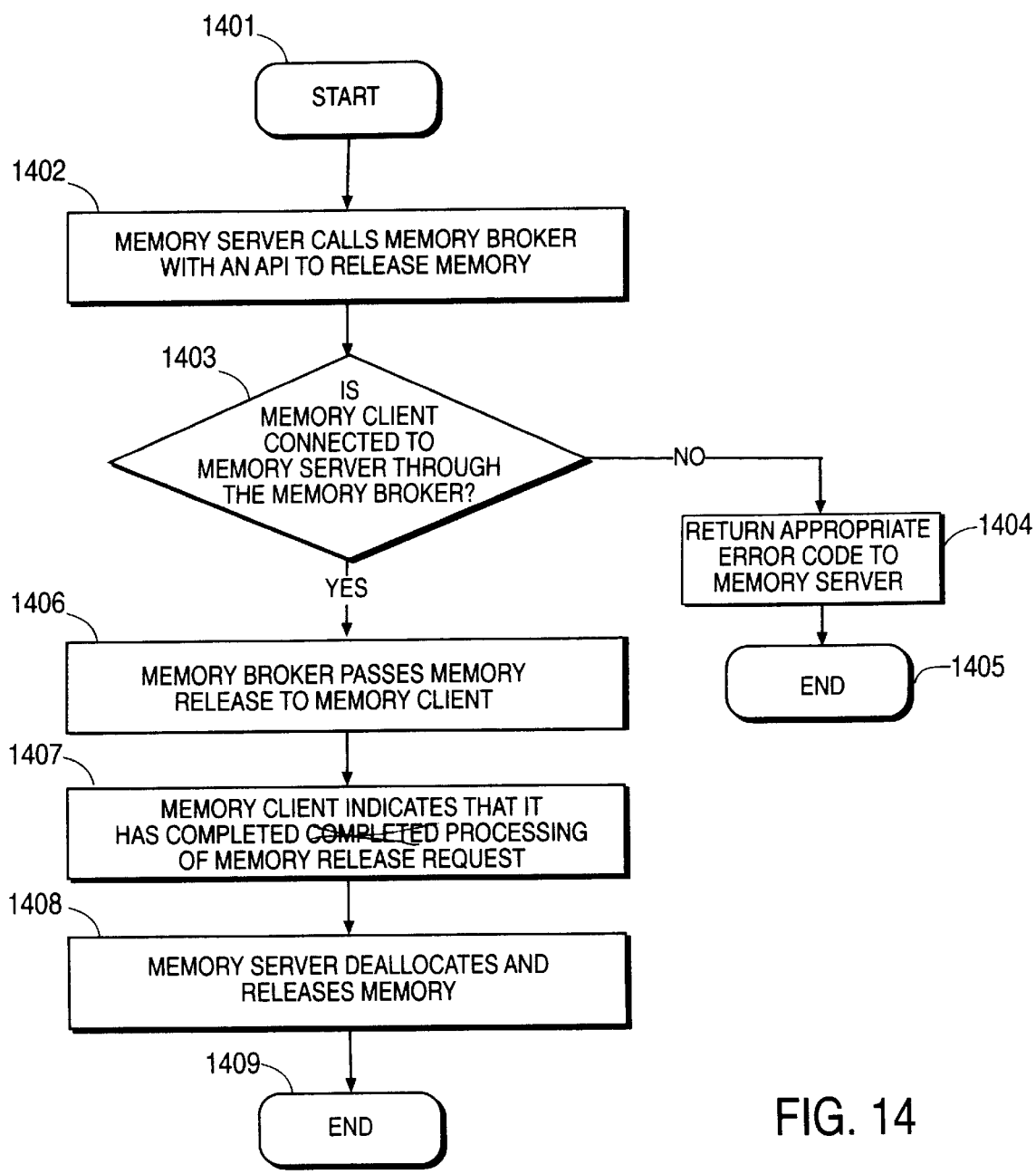
FIG. 14 is a flow diagram illustrating one embodiment of a process by which a memory server can reclaim memory allocated to a memory client.

FIG. 14 is a flow diagram illustrating one embodiment of a process by which a memory server can cause memory allocated to a memory client to be discarded or released. The process begins in step 1401 and continues to step 1402. When a memory server needs to reclaim memory previously allocated to a memory client through the memory broker, the memory server calls the memory broker in step 1402 with an API to "discard," or force the release of, the memory allocated to the memory client. From step 1402, the process continues to step 1403. In step 1403, a decision is made as to whether or not the memory client is connected to the memory server through the memory broker. If the memory client is not connected to the memory server through the memory broker, the process continues to step 1404. In step 1404, the memory broker returns an appropriate error code to the memory server. From step 1404, the process ends in step 1405.

If, in step 1403, the memory client is connected through the memory broker to the memory server, the memory broker passes the "discard" request to the memory client in step 1406. From step 1406, the process continues in step 1407. In step 1407, the memory client indicates that it has completed processing of the memory release request. Once the memory client has completed processing of the "discard" request in step 1407, the memory server deallocates the previously allocated memory page or pages and releases this memory page or these memory pages in step 1408. From 1408, the process ends in step 1409.

We claim:

1. A method for brokering memory resources in a computer system comprising the steps of:
   receiving in a memory broker in said computer system a request from a memory client for one or more portions of allocated memory having an amount and a type;
   receiving in said memory broker from memory servers information on one or more portions of available memory of said amount and type;
   requesting one or more handles from said memory servers identifying said one or more portions of available memory distributed among said memory servers, wherein said one or more portions of available memory fulfill said request for said one or more portions of allocated memory;
   receiving in said memory broker from said memory servers said one or more handles; and
   fulfillng said request for said one or more portions of allocated memory by providing a handle from said memory broker to said memory client, said handle identifying said one or more portions of available memory.

2. The method of claim 1 further comprising the step of:
   polling said memory servers to locate said one or more portions of available memory of said type.

3. The method of claim 2 further comprising the steps of:

receiving in said memory broker a first message from said memory client indicating that said memory client has completed using said one or more portions of allocated memory in said memory servers;

communicating a second message from said memory broker to said memory servers to indicate that said one or more portions of allocated memory are no longer needed; and deallocating said one or more portions of allocated memory.

4. The method of claim 2 further comprising the steps of:

receiving at said memory broker from said memory servers a first indication that said one or more portions of allocated memory must be released;

providing from said memory broker to said memory client a second indication that said memory client must discard said one or more portions of allocated memory;

discarding at said memory client a handle to said one or more portions of allocated memory;

providing from said memory client to said memory broker a third indication that said memory client has discarded said handle to said one or more portions of allocated memory;

providing from said memory broker to said memory servers a fourth indication that said handle to said one or more portions of allocated memory has been discarded; and deallocating at said memory servers said one or more portions of allocated memory.

5. The method of claim 2 further comprising the steps of:

receiving at said memory broker a first indication from said memory servers that a voluntary discard of one or more portions of allocated memory should occur;

polling a plurality of memory clients to request said voluntary discard of said one or more portions of allocated memory for which said first indication was received;

determining at each of said plurality of memory clients if said one or more portions of allocated memory for which said first indication was received can be voluntarily discarded;

receiving at said memory broker in said computer system indications that said plurality of memory clients are voluntarily discarding said one or more portions of allocated memory for which said first indication was received;

providing to said memory servers a second indication that said one or more portion of allocated memory for which said first indication was received are is being voluntarily discarded; and deallocating at said memory servers said one or more portions of allocated memory for which said first indication was received.

6. A program storage device readable by a machine, tangibly embodying a program of instructions executable by said machine to perform method steps for brokering memory resources in said machine, said method steps comprising:

receiving in a memory broker in said machine a request from a memory client for one or more portions of allocated memory of an amount and a type;

receiving in said memory broker in said machine from memory servers information on one or more portions of available memory of said amount and type;

requesting one or more handles from said memory servers identifying said one or more portions of available memory distributed among said memory servers that can fulfill said request for said allocated memory;

receiving in said memory broker in said machine from said memory servers said one or more handles; and fulfilling said request for said one or more portions of allocated memory by providing a handle from said memory broker in said machine to said memory client to allocate said one or more portions of available memory.

7. The program storage device of claim 6, said method steps further comprising:

polling said memory servers to locate said one or more portions of available memory of said type.

8. The program storage device of claim 7, said method steps further comprising:

receiving in said memory broker in said machine a first message from said memory client indicating that said memory client has completed using said one or more portions of allocated memory in said servers;

communicating a second message from said memory broker in said machine to said memory servers to indicate that said memory allocation is no longer needed; and deallocating at said memory servers said one or more portions of allocated memory.

9. The program storage device of claim 7, said method steps further comprising:

receiving at said memory broker in said machine from said memory servers a first indication that said one or more portions of allocated memory must be released;

providing from said memory broker in said machine to said memory client a second indication that said memory client must discard said one or more portions of allocated memory;

discarding at said memory client a handle to said one or more portions of allocated memory;

providing from said memory client to said memory broker in said machine a third indication that said memory client has discarded said handle to said one or more portions of allocated memory;

providing from said memory broker in said machine to said memory servers a fourth indication that said handle to said one or more portions of allocated memory has been discarded; and deallocating at said memory servers said one or more portions of allocated memory.

10. The program storage device of claim 7, said method steps further comprising:

receiving at said memory broker in said machine a first indication from said memory servers that a voluntary discard of one or more portions of allocated memory should occur;

polling a plurality of memory clients to request said voluntary discard of said one or more portions of allocated memory for which said first indication was received;

determining at each of said plurality of memory clients if said one or more portions of allocated memory for which said first indication was received can be voluntarily discarded;

receiving at said memory broker in said machine indications that said plurality of memory clients are voluntarily discarding said one or more portions of allocated memory for which said first indication was received;

providing to said memory servers a second indication that said one or more portions of allocated memory for which said first indication was received are being voluntarily discarded; and deallocating at said memory servers said one or more portions of allocated memory for which said first indication was received that are being voluntarily discarded.

11. A method for brokering memory resources comprising the steps of:

transmitting a request from a memory client to a memory broker in a computer system for the use of a page of memory;

requesting by said memory broker from memory servers one or more pointers to one or more pages of memory distributed among said memory servers that can fulfill said request for a page of memory;

providing from said memory servers to said memory broker one or more pointers to said one or more pages of memory; and providing from said memory broker to said memory client a pointer to a memory space distributed among said memory servers that fulfills said request for a page of memory.

12. The method of claim 11 further comprising the steps of:

locking by said memory servers of said memory space distributed among said memory servers; and unlocking by said memory servers of said memory space distributed among said memory servers.

13. The method of claim 12 further comprising the step of:

accessing by said memory client data stored in said memory space distributed among said memory servers.

14. The method of claim 13 further comprising the steps of:

providing from said memory client to said memory broker a first indication that said memory client has completed accessing said data in said memory space distributed among said memory servers; and providing from said memory broker to said memory servers a second indication that access to said data in said memory space distributed among said memory servers has been completed.

15. A program storage device readable by a machine, tangibly embodying a program of instructions executable by said machine to perform method steps for brokering memory resources in said machine, said method steps comprising:

transmitting a request from a memory client to a memory broker in a machine for the use of a page of memory, requesting by said memory broker from memory servers one or more pointers to one or more pages of memory distributed among said memory servers that can fulfill said request for a page of memory;

providing from said memory servers to said memory broker one or more pointers to said one or more pages of memory; and providing from said memory broker to said memory client a pointer to a memory space distributed among said memory servers that fulfills said request for a page of memory.

16. The program storage device of claim 15, said method steps further comprising:

locking by said memory servers of said memory space distributed among said memory servers; and unlocking by said memory servers of said memory space distributed among said memory servers.

17. The program storage device of claim 16, said method steps further comprising:

accessing by said memory client data stored in said memory space distributed among said memory servers.

18. The program storage device of claim 17, said method steps further comprising:

providing from said memory client to said memory broker a first indication that said memory client has completed accessing said data in said memory space distributed among said memory servers; and providing from said memory broker to said memory servers a second indication that access to said data in said memory space distributed among said memory servers has been completed.

* * * * *